Figure 1:
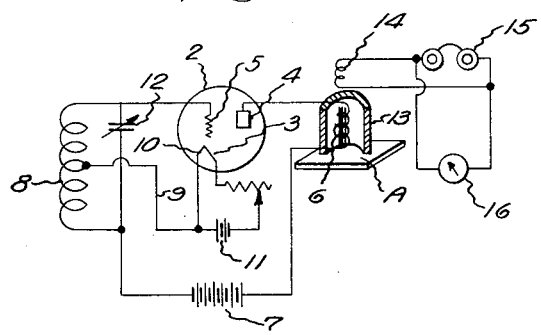

Feb. 5, 1935. W. A. MUDGE ET AL 1,990,085

METHOD AND APPARATUS FOR TESTING MATERIALS

Original Filed Jan. 10, 1927

Patented Feb. 5, 1935

1,990,085

UNITED STATES PATENT OFFICE 1,990,085

METHOD AND APPARATUS FOR TESTING MATERIALS

William Alvin Mudge and Clarence George Bieber, Huntington, W. Va.

Original application January 10, 1927, Serial No. 160,287. Divided and this application March 26, 1928, Serial No. 264,778

3 Claims. (Cl. 73—51)

This invention relates to the testing of materials, and more particularly to a method and apparatus for testing materials with regard to one or more inherent characteristics, such, for example, as hardness or soundness; or with regard to what may be termed an acquired or artificial characteristic, such as temperature, and constitutes a division of Patent No. 1,943,619, dated January 16, 1934, for Method and apparatus for testing materials.

According to the present invention, materials to be treated are tested by vibrating them at their natural frequency of vibration. Materials of like characteristics having the same chemical composition and having the same physical properties will have the same frequency of vibration under the same conditions of temperature. By comparing the frequency of vibration of a piece to be tested with the frequency of vibration of a known standard, it can be determined whether the test piece is the same as the standard. In like manner, if the temperature of the standard is known, the temperature of the test piece may be determined in the same way.

In Patent No. 1,943,619 there are disclosed several ways in which materials may be tested, both by measuring a magnetic or electrical property of the material being tested and interpolating the magnetic determination in terms of a physical characteristic, and also the mechanical vibration of the test material to determine a natural frequency of vibration therefor and interpolating this in terms of a physical characteristic. The present invention relates specifically to this latter system.

For instance, in the testing of cold rolled metal sheets it is desirable that the material be tested as it is cold rolled to determine if the material is of uniform standard as to hardness and composition. According to the present invention, the material as it emerges from the rolls or after it has been rolled can be vibrated over a wide range of frequencies which includes the natural frequency of the material. When the material being tested is being vibrated at its natural frequency the sound reaches its maximum intensity. The natural frequency of free, mechanical vibration can therefore be determined by this method. Hard materials have the higher natural frequencies. The frequency control can be so calibrated as to give direct hardness readings. This is only one application of our invention to the testing of a particular product.

As another example, in the rolling of some products it is desired that the rolls shall be maintained at a substantially even temperature. By the use of the present method and apparatus a given audible signal will be heard as long as the temperature of the roll is at the desired point. If the temperature raises or lowers, the pitch of the signal will change and the operator is immediately advised of the change in temperature. The temperature can be determined by the present method without the apparatus having any actual contact with the hot roll.

The above examples are merely illustrative of certain practical uses to which the invention is adapted but it will be understood that these are merely illustrative and that the invention is applicable to a wide range of uses for the testing and comparison of the various characteristics of different materials.

The invention may be readily understood by reference to the accompanying drawing, in which Figure 1 represents diagrammatically one embodiment of our invention for determining a given characteristic or condition by vibrating the material at an audible frequency.

Figure 2:
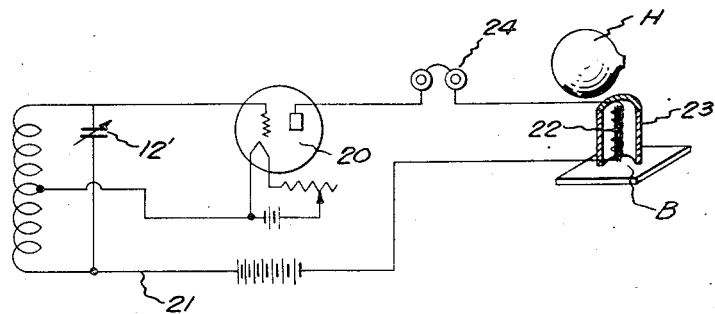

Figure 2 is a schematic view similar to Figure 1 showing the use of a Helmholtz resonator.

In the embodiment shown in Figure 1 there is a variable oscillator capable of producing a periodically varying field over a wide range of audible frequencies. The particular apparatus disclosed includes an oscillation generator, such for instance, as the thermionic valve 2 of the hot cathode type, having the usual cathode 3, anode 4, and grid or control electrode 5. The valve is included in a regenerative circuit including a coil 6, a source of plate potential 7, and an inductance 8. The mid-point of the inductance is coupled through a connection 9 to one end of the cathode 10, and the cathode is supplied with a heating circuit including a source of current 11. The other side of the inductance 8 is connected to the grid, and a variable condenser 12 is connected across the terminals of the inductance 8. In order that the circuit will generate oscillations over a wide range of frequencies, particularly audible, the coil 6 is preferably of the iron core type, and the inductance 8 and the variable condenser 12 are proportioned to secure the desired frequencies.

The coil or inductance 6 is preferably contained in a housing 13 in which it is rigidly supported and which is a shield for confining the field of the magnet coil 6 to a definite area.

According to a preferred embodiment of the invention there is provided a pick-up coil 14 inductively coupled to the magnet coil 6 and in circuit with an audible translating device, such as a telephone, 15. A visible indicator 16 may also be included in the translating circuit in addition to or in place of the telephone.

When operating the device illustrated in Figure 1, the casing or housing 13 is placed upon the material to be tested. This is designated A. As soon as the generation of oscillations is started by operating the thermionic valve, the piece A will be vibrated by the field set up by the magnet coil 6. The oscillator is then adjusted by means of the variable condenser 12 to vary the frequency of oscillation until the circuit is brought into resonance with the frequency of free vibration of the material A to be tested. When the circuit is in resonance with the natural frequency of the material being tested, maximum current flows through the coil 6, and there is a maximum transfer of energy to the translating device 15. When the condenser 12 is being adjusted, the intensity of the sound of the translating device 15 will increase as long as the circuit is being tuned into resonance with the natural frequency of vibration of the sample A. When the condenser 12 is being adjusted to tune the circuit out of resonance with the natural frequency of vibration A, the sound in the translating device will be a gradually diminishing one.

Thus by reaching the point where the sound is of maximum intensity the operator knows that he has reached the point of resonance for the particular sample A being tested. If the sample A is of certain known characteristics, all other materials having the same characteristics will produce the same sound intensity with the same setting of the condenser 12 which may be calibrated directly in terms of hardness or temperature.

In the testing of metal sheets, for instance, the circuit is adjusted to the resonance of a piece of standard sheet material and then the pieces to be tested are successively brought under the housing 13 of the magnet coil 6. Where the sound intensity is below that of the standard piece or where the pitch of the note heard in the audible translating device is different, the operator knows that the particular piece being tested is not standard.

Thus it will be seen that the device will respond to changes in the hardness of material, changes in density, changes in chemical composition, or changes in temperature. Any change in the material being tested which changes the natural frequency of vibration for that material may be detected by the present method and apparatus.

Under some conditions of operation the piece A itself can be heard to vibrate, and the sound will increase in intensity as the natural period of frequency of vibration thereof is approached. By listening to the note or sound produced by the vibration of the piece A, the translating circuit, including the pick-up coil 14 and telephone 15, can be eliminated.

However, by using a translating circuit more accurate results can be secured and the translating device can be remotely located from the magnet coil 6. For instance, in a mill where sheets were being tested the external noises in the mill might interfere with the accurate determination of the characteristics of the material or objects being tested. The telephone 15, under these conditions, can be located at a less noisy and more convenient point. Also, in the testing of hot sheets or hot rolls it would not be convenient to listen to the note produced by the object being tested.

Inasmuch as the frequency of free vibration of the material being tested depends not only on the composition of the material, but also on the area of the material being vibrated, it is important that the housing or holder 13 be the same for various test pieces so that the same area is exposed to the oscillating field in making comparative tests.

In the testing of temperatures it is preferable with the apparatus shown in Figure 1 to always maintain a test piece similar to A against the housing of the magnet coil. The test piece will receive heat by radiation from the hot object being tested and the magnet coil is shielded from direct exposure to the hot piece. This arrangement permits very close determination of temperatures far below that of an optical or radiation pyrometer and within the range of a thermocouple. In determining the temperature of a revolving roll, for instance, a radiation pyrometer can not be used because of the temperature ordinarily being too low while a thermocouple is not highly satisfactory because it can not be maintained against the surface of a revolving roll.

By using a test plate such as A to shield the magnet coils 6 and subjecting the piece corresponding to A to radiated heat alone, the invention can be satisfactorily used in determining the temperatures of large masses of metals which are sufficiently hot as to have a deleterious effect upon the insulation of the magnets 6 if the magnets were brought into such close proximity as to actually vibrate a portion of the hot mass of metal. For instance, by radiating heat to a plate such as A from a pot of molten metal, the temperature of the metal in the pot can be measured although the coil 6 is remotely located from the pot of metal itself. The temperature is measured by the change which the radiated heat effects in the natural frequency of free vibration of the piece A.

The same arrangement may be used in measuring the temperature of a revolving roll or other large object to be tested where it is not practical to actually vibrate the object itself.

In the arrangement shown in Fig. 2, we have designated the test piece B. We have shown an electron tube oscillator circuit including an electron tube 20, a regenerative circuit therefor having a tuning condenser 12' and having a coil 22 and headphones 24 in the plate circuit thereof, the numeral 21 designating the plate return side of the circuit. The coil 22 is in a casing 23, the arrangement being similar to the arrangement shown in Fig. 1. At H is designated a Helmholtz resonator of a tone frequency comparable to that of the natural frequency of vibration of a given standard of material.

When the circuit is energized the test piece B is vibrated, and by tuning the condenser 12' the rate of vibration can be varied until a natural frequency is reached at which maximum vibration will occur. The earphones enable this maximum point to be determined. If this maximum frequency corresponds to the resonator H so as to establish resonance, an increase in sound is noted by the resonator. If the resonator has the frequency of the standard with respect to which test piece B is being compared, this resonance between the natural period of the piece B and the resonator H will indicate that piece B corresponds to the given standard.

The test piece B has the greatest amplitude of vibration when the frequency of vibration corresponds to a natural frequency for that piece. The ear phones enable the point of maximum vibration to be audibly determined. Likewise, resonance between the test piece and the resonator is audibly indicated, as the sound effect produced by the resonator diminishes as the frequency increases or decreases from the point of resonance.

Although we have disclosed an oscillation circuit including a hot cathode electron valve, it will be understood that the invention contemplates the use of any oscillation generator. Various changes and modifications may be made in the particular apparatus shown and in the construction and arrangement of parts in the drawing and description herein particularly given to be considered merely as illustrative of certain preferred embodiments of our invention.

We claim:

1. Apparatus for testing material including variable means for generating oscillating currents over a range of frequencies within the range of audibility, an electro-magnet connected with said variable oscillation generator, and a shield partly enclosing said magnet for confining its field to a definite small area of the piece being tested.

2. Apparatus for testing material including an iron core electro-magnet, a housing for said electro-magnet adapted to be placed against the piece of material to be tested for confining the action of the field of said magnet to a restricted area of the material being tested, and a variable audio-frequency oscillation generator in circuit with said magnet.

3. The method of testing material which comprises placing an electromagnet in an oscillating circuit in proximity to the material to be tested and subjecting only a relatively small area of the material to be tested to the field of said electromagnet, tuning the oscillating circuit for the electromagnet into resonance with the natural frequency of the material being tested, and audibly determining the point of resonance.

WILLIAM ALVIN MUDGE.
CLARENCE GEORGE BIEBER.